US011754692B2

(12) United States Patent
DeWeert

(10) Patent No.: US 11,754,692 B2
(45) Date of Patent: Sep. 12, 2023

(54) LIDAR POLARIMETRY

(71) Applicant: BAE Systems Information and Electronic Systems Integration Inc., Nashua, NH (US)

(72) Inventor: Michael J. DeWeert, Kaneohe, HI (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 621 days.

(21) Appl. No.: 16/836,000

(22) Filed: Mar. 31, 2020

(65) Prior Publication Data

US 2021/0302555 A1 Sep. 30, 2021

(51) Int. Cl.
| | |
|---|---|
| *G01S 7/499* | (2006.01) |
| *G01S 17/08* | (2006.01) |
| *G01S 17/89* | (2020.01) |
| *G01S 7/48* | (2006.01) |
| *G02B 27/42* | (2006.01) |
| *G02F 1/13357* | (2006.01) |
| *F21V 8/00* | (2006.01) |

(52) U.S. Cl.
CPC ............ *G01S 7/499* (2013.01); *G01S 7/4808* (2013.01); *G01S 17/08* (2013.01); *G01S 17/89* (2013.01); *G02B 6/0056* (2013.01); *G02B 27/4261* (2013.01); *G02F 1/13362* (2013.01)

(58) Field of Classification Search
CPC .......... G01S 17/08; G01S 17/18; G01S 17/46; G01S 17/89; G01S 7/4808; G01S 7/499; G02B 27/4261; G02B 6/0056; G02F 1/13362

USPC ......................................................... 356/4.01
See application file for complete search history.

(56) References Cited

U.S. PATENT DOCUMENTS

| | | | | |
|---|---|---|---|---|
| 11,231,502 | B2* | 1/2022 | Thayer | G01S 7/4865 |
| 2012/0026497 | A1* | 2/2012 | Mathur | G01N 21/47 |
| | | | | 356/342 |
| 2012/0112093 | A1* | 5/2012 | Rosen | G01J 3/44 |
| | | | | 356/369 |
| 2014/0079388 | A1* | 3/2014 | Mikhailov | H04B 10/07953 |
| | | | | 398/26 |
| 2018/0024270 | A1* | 1/2018 | Ray | G01S 7/4815 |
| | | | | 356/336 |
| 2019/0018143 | A1* | 1/2019 | Thayer | G01S 17/89 |
| 2021/0201450 | A1* | 7/2021 | Kurita | G06T 5/002 |

* cited by examiner

*Primary Examiner* — Kathleen M Walsh

(74) *Attorney, Agent, or Firm* — Sand, Sebolt & Wernow LPA; Gary McFaline

(57) ABSTRACT

The present disclosure provides a system and method for determining a range to an object in a fluid. The system includes a polarized light source directed to the object in the fluid, a first imaging sensor, a second imaging sensor, and at least one processor. The at least one processor characterizes a depolarization rate of the fluid and determines the range to the object. The method includes generating polarized light via a polarized light source, polarizing an imager relative to the polarized light, transmitting the polarized light from the polarized light source into the fluid, receiving reflected light from the object, characterizing a depolarization rate of the fluid, based, at least in part, on the reflected light, and determining the range to the object, based, at least in part, on the depolarization rate of the fluid.

18 Claims, 7 Drawing Sheets

LIDAR POLARIMETRY

BACKGROUND

Technical Field

The present disclosure relates generally to the detection and characterization of objects. More particularly, the present disclosure relates to the determination of a precise distance from sensor to objects in a scattering medium through the use of imagery analysis.

Background Information

Electrical systems that enhance situational awareness are beneficial inasmuch as they provide information about an environment that would otherwise be difficult to detect without the electrical system. One exemplary electrical system or device is a light amplification detection and ranging (LIDAR) system. A LIDAR system or a LIDAR assembly is typically carried by a moving platform, such as an aircraft, regardless of whether it is manned or unmanned. The LIDAR assembly generates a beam of light (i.e., a laser beam) that is directed at an object. The beam is reflected back and captured by a polarization-sensitive sensor. The radiation returns are analyzed by software, logic, or other electrical processes. The processing of the returned radiation enables a computer implemented device or process to evaluate the return radiation data and generate a map of surfaces that the beam contacted.

In one example, a LIDAR assembly is used to map the floor of the ocean. In this example, the beam from the LIDAR is directed downwardly into the sea water. The LIDAR may be either flown above the surface of the ocean and directed downwardly into the ocean, or the LIDAR may be carried by a ship or underwater vehicle and be directed into the water without needing to travel through the atmosphere before reaching the ocean floor. The light beam penetrates the ocean and travels down to the sea bottom or underwater objects where it is reflected back as a return radiation. The return radiation is processed to generate a 3D map of the ocean and embedded objects.

Mapping below the ocean surface is advantageous inasmuch as it provides accurate representations of the marine environment. However, sometimes mapping subsurface marine environments can be difficult due to naturally occurring disturbances in the ocean which cause glints or scattering events that can disrupt the light or laser beam in the LIDAR systems. Further, scattering interference from the medium and suspended or dissolved materials adds blur and veiling radiance that impede precise localization, including, but not limited to, accurate depths or ranges of objects.

Still further, for non-polarimetric range-gated LIDAR systems, the precision of range estimation is limited to the width and separation of the LIDAR range gates. For example, if the range gate is five meters thick, the objects can be localized to within five meters of range. To achieve precise range determination requires collecting multiple image slices (i.e., data at many ranges with small range separations) and generating a data "cube" based on the collected image slices. The data cube is then processed to compute precise range. The 3D data cube entails a processing and data-storage burden much greater than is required for detecting objects in two-dimensional (2D) images. In addition, blur due to multiple forward scattering further impedes identification of object edges, reducing range-estimation accuracy.

SUMMARY

In some instances, it may be difficult to accurately determine range or depth of objects of interest below the surface of the ocean because glints, scattering interference, wave refraction, or other properties of the medium can disrupt a light beam generated by a LIDAR assembly and observed by a polarization-sensitive sensor or camera. The present disclosure addresses these and other issues. More particularly, the present disclosure addresses these issues by providing a LIDAR polarimetry system that can precisely determine range or depth through the use of cameras or polarization-sensitive sensors that are polarized relative to the beam generated by the LIDAR assembly. As such, polarimetric LIDAR imaging provides a means for mitigating the deleterious effects of scattering to render accurate estimates of depths or ranges to objects in the ocean.

The LIDAR polarimetry system utilizes various types of polarization, including, but not limited to, linear polarization, circular polarization, and elliptical polarization to accurately estimate the depths or ranges of objects of interest. Linear polarization of electromagnetic radiation is a confinement of the electric field vector or magnetic field vector to a given plane along the light propagation direction. Generally, the polarization state of an electromagnetic wave is defined by the direction of the electric field vector. For example, if the electric field vector is vertical (alternately up and down as the wave travels), the radiation is said to be vertically polarized.

More generally, linear polarization is a special case of elliptical polarization. In elliptical polarization, the tip of the electric field vector varies in time, tracing an ellipse in the plane normal to the light propagation direction. The total electromagnetic field can be resolved into a superposition of two linearly-polarized waves with their electric fields at right angles to each other, defining the major axis and minor axis of the ellipse. In linear polarization, the minor axis approaches zero length. A degree of linear polarization (DOLP) is a quantity used to describe the ratio of intensity of the linearly polarized components of an electromagnetic wave (such as a laser beam) to the total intensity thereof. A perfectly linearly polarized wave has a DOLP of 100%, whereas an unpolarized wave has a DOLP of 0%. A wave which is partially polarized, and therefore can be represented by a superposition of a polarized and unpolarized component, will have a DOLP somewhere in between 0 and 100%. DOLP is calculated as the fraction of the total power that is carried by the polarized component of the wave.

Similarly, circular polarization is a special case of elliptical polarization in which the minor axis equals the major axis. In addition to the ratio of minor to major axis lengths, and the orientation of the major axis, elliptical polarization is characterized by the rotation direction of the electric field along the polarization ellipse. The field may rotate either right-handedly or left-handedly with respect to the direction of propagation. In technical discussions, this handedness is also called chirality. Thus, there are two different directions of circular polarization, distinguished by chirality. Elliptical polarization states are further distinguished by the ratio of major to minor axes, and by the direction of the major axis, in addition to the chirality.

DOLP can be used to distinguish circularly-polarized chirality, by using optical components known as quarterwave plates (QWPs) to convert circular polarization to linear polarization. This enables detection in which a DOLP quantifies the degree of circular polarization (DOCP). The process may be further generalized to discriminate different elliptical polarization states via combinations of beam splitters, linear polarizers, and wave plates. Similarly, elliptical polarization may be resolved into a combination of linear components by using a combination of wave plates and beam splitters, and DOLP can be computed for those linear components. Thus, DOLP can be made sensitive to changes in linear, circular, or elliptical polarization, to compute the DOP (Degree of Polarization), which is a quantity used to describe the ratio of intensity of the polarized components of an electromagnetic wave (such as a laser beam) to the total intensity thereof, for those polarization types. It should be noted that the DOP may also be referred to as the polarization intensity.

In scattering media, there can be differences between polarization types in the rates at which an initially perfectly-polarized beam is scattered into a combination of polarization states. In particular, the rate of conversion of light of one circular polarization into light of the opposite circular polarization may occur over a greater distance than for conversion of a linearly polarized beam into other linear polarizations. This difference in depolarization rates will enable determination of range at greater distances by using the optimal combination of laser and receiver polarizations.

Because different materials reflect polarized light differently, illuminating a scene with polarized light and recording the polarization state of the reflected radiation can discriminate various objects of interest. Accurately registering polarization information with precise range to target and three-dimensional (3D) shape information would enhance the discriminatory power.

By using a pulsed laser illuminator and range-gated cameras, environmental scattering interference is minimized, allowing polarized imagery of objects of interest. Range-gated polarimetry has proven useful, for example, in remote imaging of objects in the ocean, and for discriminating between objects on land.

In one exemplary aspect, an embodiment of the present disclosure may provide a method for determining a range to an object in a fluid including operably engaging an imager to a polarized light source, generating polarized light via the polarized light source, polarizing the imager relative to the polarized light, transmitting the polarized light from the polarized light source into the fluid, receiving reflected polarized light from the object, characterizing a depolarization rate of the fluid, based, at least in part, on the reflected polarized light, and determining the range to the object, based, at least in part, on the depolarization rate of the fluid. The generated polarized light may be linearly polarized, circularly polarized, and/or elliptically polarized.

In one example, the method further includes utilizing a single image plane of the imager to receive the reflected polarized light from the object; wherein the single image plane includes an array of polarization-selective pixels. In another example, the method further includes utilizing at least two polarization-sensitive sensors of the imager to receive the reflected polarized light from the object.

In one example, the method further includes linearly co-polarizing one of the at least two polarization-sensitive sensors relative to the polarized light and linearly cross-polarizing one of the at least two polarization-sensitive sensors relative to the polarized light. In another example, the method includes circularly co-polarizing one of the at least two polarization-sensitive sensors relative to the polarized light and circularly cross-polarizing one of the at least two polarization-sensitive sensors relative to the polarized light. In yet another example, the method further includes elliptically co-polarizing one of the at least two polarization-sensitive sensors relative to the polarized light and elliptically cross-polarizing one of the at least two polarization-sensitive sensors relative to the polarized light.

The method further includes transmitting the polarized light from the polarized light source into the fluid over successive time delays, collecting at least one set of polarized images from a plurality of the successive time delays, and computing a polarization intensity versus range, based, at least in part, on the at least one set of polarized images. Characterizing the depolarization rate of the fluid may be based, at least in part, on the polarization intensity versus range. The method further includes computing an overall attenuation rate of the transmitted polarized light in the fluid based, at least in part, on the polarization intensity versus range, computing a scattering rate of the fluid based, at least in part, on the polarization intensity versus range, and computing, if present, depolarization properties of a bottom underlying the fluid based, at least in part, on the polarization intensity versus range.

The method further includes generating a lookup table containing values of range versus degree of polarization (DOP). In one example, generating the lookup table containing values of range versus DOP is accomplished via numerical modeling. The method further includes setting parameters of the numerical modeling based, at least in part, on the depolarization rate of the fluid to optimize the numerical modeling of the range versus DOP. In another example, generating the lookup table containing values of range versus DOP is accomplished via compiling known values of range versus DOP. The method further includes gating the at least two polarization-sensitive sensors. The method further includes selecting a desired final range precision value and selecting gate parameters of the at least two polarization-sensitive sensors to encompass range spans greater than the desired final range precision value.

The basic mathematics of range-from-polarization computation is described as follows: The LIDAR background returns ($R_{Bgd,Co}$ for co-polarized and $R_{Bgd,Xr}$ for cross-polarized) from the scattering medium and an opaque boundary (such as the bottom of an ocean) are:

$$R_{Bgd,Co}(z) = I_{Transmitted} \times \left[ \begin{array}{l} \rho_W(z)\exp(-2Kz)D_{Co}(z)\Theta(z_{Bott}-z) + \\ \rho_{Bott}\exp(-2Kz_{Bott})D_{Co}(z_{Bott})\delta(z_{Bott}-z) \end{array} \right], \quad \text{Equation (1)}$$

with $$D_{Co}(z) = \frac{1}{2}[1 + \exp(-2d_{Pol}b_F z)] \quad \text{Equation (2)}$$

for the co-polarized background return, and:

$$R_{Bdg,Xr}(z) = I_{Transmitted} \times \left[ \begin{array}{l} \rho_W(z)\exp(-2Kz)D_{Xr}(z)\Theta(z_{Bott}-z) + \\ \rho_{Bott}\exp(-2Kz_{Bott})D_{Xr}(z_{Bott})\delta(z_{Bott}-z) \end{array} \right], \quad \text{Equation (3)}$$

with $$D_{Xr}(z) = \frac{1}{2}[1 - \exp(-2d_{Pol}b_F z)] \quad \text{Equation (4)}$$

for the cross-polarized background return. The range z is to be understood as a propagation distance in the medium of interest, and is not necessarily in the vertical direction. For example, the range z may be horizontal or at an incline for a vehicle-borne LIDAR system. Likewise, the range to an opaque boundary $z_{Bott}$ may be the range to the ground or bottom, the range to a vertical boundary such as a wall or cliff, or any other opaque boundary.

The medium reflectance-per-unit-range pw depends on the turbidity of the medium, and may also depend on range z in optically-stratified media. In Equation (1) and Equation (3), the opaque-boundary is assumed to be de-polarizing (a typical condition), so that the reflectance $\mu_{Bott}$ is equal for both polarization directions. For boundaries which have partially-depolarizing reflectances, Equation (1) and Equation (3) would be modified to include separate reflectances for each polarization direction. The relative magnitudes of the co-polarized and cross-polarized reflectances can be determined empirically from LIDAR returns straddling or stepping through the boundary. The intensity of the beam at range z=0 is given by $I_{Transmitted}$. As the light propagates in the medium, it is attenuated exponentially with a decay constant K, so that the two-way attenuation is exp(−2Kz). In addition to attenuation, the medium also scatters the propagating light. Via multiple forward scatterings, an initially polarized beam is depolarized, so that the DOP decays exponentially with decay constant $d_{Pol} \times b_F$, where $b_F$ is the forward-scattering coefficient of the medium, and $d_{Pol}$ is the depolarization rate constant. For seawater, the value of $d_{Pol}$ is approximately 0.14. Other scattering media may have different values for $d_{Pol}$, which can be determined empirically by measuring the DOP versus range in the medium.

The total background return $R_{Bgd,T}$ (co-polarized plus cross-polarized) is proportional to the sum of water and background reflectances weighted by the exponential attenuation:

$$R_{Bdg,T}(z)/I_{Transmitted} = R_{Bdg,Co}(z) + R_{Bdg,Xr}(z) = [\rho_W(z)\exp(-2Kz)\Theta(z_{Bott}-z) + \rho_{Bott}\exp(-2Kz_{Bott})\delta(z_{Bott}-z)] \quad \text{Equation (5)}.$$

An object embedded in the medium contributes positive reflection signal and negative shadow signals to the LIDAR returns according to:

$$R_{Obj,Co}(z)/I_{TRansmitted} \approx \begin{bmatrix} \rho_{Obj}D_{Co}(z_{Obj})\delta(z_{Obj}-z) \\ -\rho_W(z)D_{Co}(z)\Theta(z-z_{Obj})\Theta(z_{Bott}-z) \\ -\rho_{Bott}D_{Co}(z_{Bott})\delta(z-z_{Bott}) \end{bmatrix} C_{Obj}(z)\exp(-2Kz). \quad \text{Equation (6)}$$

The step function in equation (6) is given by:

$$\Theta(z) = \begin{cases} 1, & z \geq 0 \\ 0, & z < 0 \end{cases}. \quad \text{Equation (7)}$$

$C_{Obj}(z)$, which is in the range between zero and one, is a blur-induced contrast reduction factor, which depends on object size and the scattering properties of the medium. $C_{Obj}(z)$ can be determined empirically from LIDAR data, or it can be modeled from first principles. As with the opaque-boundary reflectance, the object reflectance will commonly be independent of polarization, so that $$R_{Obj,Xr}(z) = R_{Obj,Co}(z) \quad \text{Equation (8)}.$$

In cases in which the object does not completely depolarize the reflected light, separate reflectance for co-polarization and cross-polarization would be used in place of $\rho_{Obj}$.

The model presented herein illustrates the basic physics and essential principles of polarimetric ranging. More-complete theoretical approximations are also available, via numerical simulations. The total LIDAR returns in the co-polarized and cross-polarized channels are the sum of the background and object returns, integrated over the range gate. For the case of objects suspended in the medium, with a gate that does not straddle the boundary, the total returns are:

$$R_{Co}(z_{Obj}) = \int_{z_1}^{z_2} dz [R_{Bdg,Co}(z) + R_{Obj,Co}(z)] = I_{Transmitted} \times \quad \text{Equation (9)}$$

$$\int_{z_1}^{z_2} dz \exp(-2Kz) \left\{ \begin{array}{l} \rho_W(z)D_{Co}(z)[1 - \Theta(z - z_{Obj})C_{Obj}(z)] + \\ \rho_{Obj}D_{Co}(z_{Obj})\delta(z_{Obj} - z)C_{Obj}(z) \end{array} \right\},$$

and $$R_{Xr}(z_{Obj}) = I_{Transmitted} \times \quad \text{Equation (10)}$$

$$\int_{z_1}^{z_2} dz \exp(-2Kz) \left\{ \begin{array}{l} \rho_W(z)D_{Xr}(z)[1 - \Theta(z - z_{Obj})C_{Obj}(z)] + \\ \rho_{Obj}D_{Xr}(z_{Obj})\delta(z_{Obj} - z)C_{Obj}(z) \end{array} \right\}.$$

The degree of polarization is then given by:

$$DOP(z_{Obj}) = \frac{[R_{Co}(z_{Obj}) - R_{Xr}(z_{Obj})]}{[R_{Co}(z_{Obj}) + R_{Xr}(z_{Obj})]}, \quad \text{Equation (11)}$$

where $$[R_{Co}(z_{Obj}) - R_{Xr}(z_{Obj})] \approx \quad \text{Equation (12)}$$

$$I_{Transmitted} \times \begin{bmatrix} \int_{z_1}^{z_2} dz \exp(-2Kz)\rho_W(z)\exp(-2d_{Pol}b_F z) \\ [1 - \Theta(z - z_{Obj})C_{Obj}(z)] + \\ \rho_{Obj}\exp(-2d_{Pol}b_F z_{Obj})C_{Obj}(z) \end{bmatrix},$$

and $$[R_{Co}(z_{Obj}) + R_{Xr}(z_{Obj})] \approx \quad \text{Equation (13)}$$

$$I_{Transmitted} \times \left\{ \int_{z_1}^{z_2} dz \exp(-2Kz)\rho_W(z)[1 - \Theta(z - z_{Obj})C_{Obj}(z)] + \rho_{Obj}C_{Obj}(z_{Obj}) \right\}.$$

Equation (11) gives a relationship between the DOP and the range to object, bounded by the starting and ending ranges $z_1$ and $z_2$. Thus, it gives a more-precise range to target than a conventional gated LIDAR, which could only yield that the object is somewhere in the gate. An exemplary refinement is to operate the gates so that the co-polarized and cross-polarized channels have separate, but overlapping ranges $z_1$ and $z_2$. This could be useful, for example, when one requires that an object is detectable over wide range of depths, but only requires precise ranging over a more-limited span.

In addition to entities in the water column such as, for example, underwater vehicles and other items of interest, the object to be ranged to can include the bottom of the body of water, effecting a three-dimensional mapping application. This relies on characterizing the relative depolarizing reflectances (e.g., co-polarized (CoPol) versus cross-polarized (XrPol)) of the bottom, either from historical data of known bottom types, from modeling, or from data collected with the narrow polarimetric gates set to equal ranges. With the relative polarimetric reflectances of the bottom known, the polarimetric gates would be widened to include both bottom and a significant water reflectance component. The combined water plus bottom DOP is related to bottom depth via Equation (11). Three-dimensional mapping in accordance with the present disclosure utilizes cheaper equipment compared to equipment required for standard bottom-mapping LIDAR. Further, three-dimensional mapping in accordance with the present disclosure provides simultaneous high-resolution data over a wide area, and can thus be faster than standard bottom-mapping LIDAR.

In another exemplary aspect, an embodiment of the present disclosure may provide a detection system that includes a polarized beam, such as a laser beam or another type of light-based beam, and polarization-sensitive sensors to observe and detect return radiations from an object, wherein the polarization-sensitive sensors are polarized relative to the beam. In one instance, a pair of polarization-sensitive sensors may be used, a first one linearly co-polarized (CoPol) relative to the beam, and a second one cross-polarized (XrPol) relative to the beam. In another embodiment, a multiplicity of polarization-sensitive sensors with additional polarizations, for example ±45 degrees, may be used. In another embodiment, the laser may be circularly polarized, with two or more polarization-sensitive sensors having different circular or linear polarizations.

In accordance with one aspect of the present disclosure, an exemplary embodiment of an ocean LIDAR polarimetry system exploits the fact that (i) polarized light depolarizes at a finite rate as it moves through a multiple-scattering fluid; (ii) glints and backscatter tend to preserve polarization, so that a polarized beam backscattered from the scattering medium is still at least partially polarized; (iii) the scattering-medium depolarization rate is approximately exponential with range; (iv) the depolarization can be characterized via degree of polarization (DOP) measurements with a polarimetric LIDAR; (v) the depolarization rate is likely to be at least as long for circularly polarized light and elliptically polarized light as for linearly polarized light; (vi) the ocean bottom and many objects of interest depolarize the LIDAR light upon reflection, and (vii) the apparent DOP of such depolarizing objects is composed of the object LIDAR reflection combined with the scattering medium polarized reflection in such a manner that the apparent DOP can be related to the range to the depolarizing object.

In accordance with another aspect of the present disclosure, an exemplary embodiment of an ocean LIDAR polarimetry system and method thereof may include characterizing the depolarization rate of the fluid. This requires a highly-polarized light source and two or more polarization-sensitive sensors, at least one of which is co-polarized with the laser and at least one of which is oppositely-polarized versus the laser.

Computation of a DOP versus range curve begins with characterizing the background medium. For water characterization, the polarization-sensitive sensors typically need to be aligned to have overlapping (such as identical) fields of view. The extinction ratios of orthogonal polarization directions, and the dynamic ranges of the detectors, must be sufficient to discriminate small polarizations of backscattered light. The sensors are also gated or time-resolved, so that LIDAR-return intensity versus range can be measured for each polarization-sensitive sensor. The water is characterized by collecting intensity-versus range in the two polarization-sensitive sensors, and computing from their ratios or differences (a) the depolarization rate of the medium versus time or distance, (b) the overall attenuation rate of light in the medium versus time or distance, and (c) the presence and depolarization properties of the sea bottom (if present).

In accordance with another aspect of the present disclosure, an exemplary embodiment of an ocean LIDAR polarimetry system and method thereof may utilize the data from the characterization of the scattering medium to set polarized-LIDAR polarization-sensitive sensor parameters (time delays, integration times, gains, etc.) so as to optimally measure the reflections of water, the sea bottom, and of any objects intervening between the LIDAR and the sea bottom. Versus the water backscatter, an object of interest will typically appear more cross-polarized than the water. Versus the sea bottom, the object of interest will typically appear less cross-polarized. Thus, LIDAR polarimetry can actually exploit scattering to improve object detection and discrimination.

In accordance with another aspect of the present disclosure, an exemplary embodiment may provide a method for determining a range to an object in a fluid including operably engaging an imager to a polarized light source, generating polarized light via the polarized light source, polarizing the imager relative to the polarized light, transmitting the polarized light from the polarized light source into the fluid, receiving reflected polarized light from the object, characterizing a depolarization rate of the fluid, based, at least in part, on the reflected polarized light; and determining the range to the object, based, at least in part, on the depolarization rate of the fluid.

In accordance with another aspect of the present disclosure, an exemplary embodiment may provide a system for determining a range to an object in a fluid, comprising a polarized light source directed to the object in the fluid, a first imaging sensor receiving a reflected light from the fluid, wherein the first imaging sensor is cross-polarized with the polarized light source, a second imaging sensor receiving the reflected light from the fluid, wherein the second imaging sensor is co-polarized with the polarized light source, at least one processor for characterizing a depolarization rate of the fluid, based, at least in part, on the reflected light and determining the range to the object, based, at least in part, on the depolarization rate of the fluid. In one example, the system may further include an additional polarized light source. The polarized light source is one of linearly polarized, circularly polarized, or elliptically polarized. The system may further include a degree of polarization (DOP) measurement determined by the at least one processor. The range to the object is based, at least in part, on the DOP measurement. In one example, the range determination is bounded by a starting range and an ending range. The system may further include at least one set of polarized images collected over a plurality of successive time delays, and a polarization intensity versus range measurement determined by the at least one processor. The polarization intensity versus range measurement is, based, at least in part, on the at least one set of polarized images. The system may further include a platform carrying polarized light source, the first imaging sensor, and the second imaging sensor.

In accordance with another aspect of the present disclosure, an exemplary embodiment may provide a system and method for determining a range to an object in a fluid. The system includes a polarized light source directed to the object in the fluid, a first imaging sensor, a second imaging sensor, and at least one processor. The at least one processor characterizes a depolarization rate of the fluid and determines the range to the object. The method includes generating polarized light via a polarized light source, polarizing an imager relative to the polarized light, transmitting the polarized light from the polarized light source into the fluid, receiving reflected light from the object, characterizing a depolarization rate of the fluid, based, at least in part, on the reflected light, and determining the range to the object, based, at least in part, on the depolarization rate of the fluid.

The discrimination of objects of interest versus the natural background can be done with both polarized polarization-sensitive sensors set to the same depths/ranges, or with them set to different depths/ranges. Likewise, the range determination can be accomplished with both polarized polarization-sensitive sensors set to the same depths/ranges, or with overlapping gates set to different starting and ending depths/ranges.

The method employed to exploit the de-polarization rate of light in the ocean is:
 i. Transmit one or more polarized laser pulses, and record for each pulse, at least one set of polarized images with gates time-delayed relative to the laser pulse time,
 ii. Characterize the attenuation and polarization properties of water in the area of interest,
 iii. Identify any de-polarizing bathymetric features or clutter,
 iv. Compute numerical models of polarized LIDAR returns versus range for objects of interest in the scattering medium,
 v. Compute a lookup table of DOP versus range to object,
 vi. Via LIDAR imaging or other methods, identify objects of interest in the scattering medium,
 vii. Use polarimetric LIDAR to collect images of objects of interest, and process to determine DOP, and
 viii. Infer from the object DOP and DOP-to-range lookup table the precise range to the objects(s) of interest.

BRIEF DESCRIPTION OF THE SEVERAL VIEWS OF THE DRAWINGS

Sample embodiments of the present disclosure are set forth in the following description, is shown in the drawings and is particularly and distinctly pointed out and set forth in the appended claims.

Similar numbers refer to similar parts throughout the drawings.

DETAILED DESCRIPTION

Figure 1:
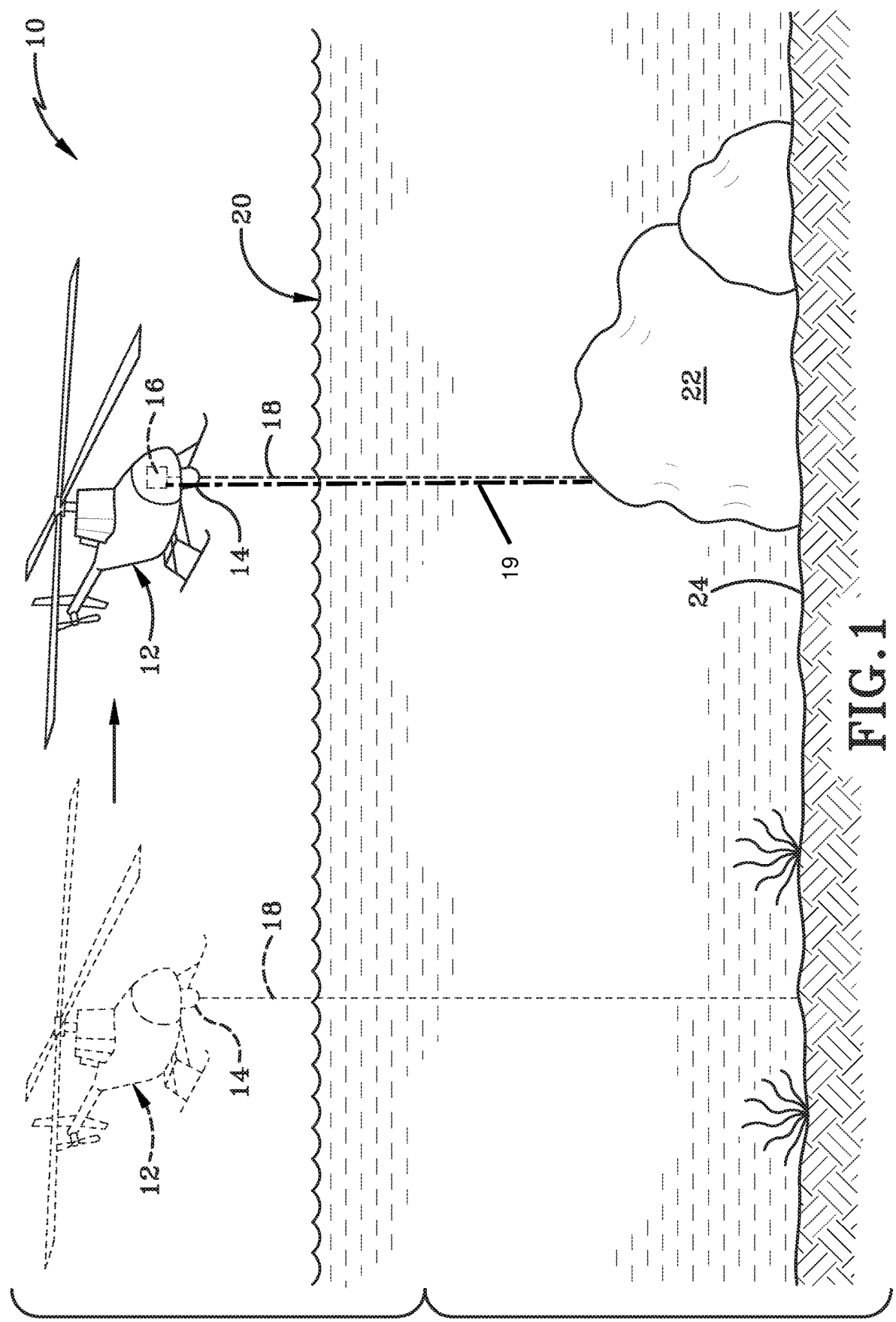
FIG. 1 (FIG. 1) is a diagrammatic view of a system for ocean LIDAR polarimetry systems in accordance with the present disclosure.

FIG. 1 depicts a laser imaging detection and ranging (LIDAR) system generally at 10. More particularly, system 10 may be considered an ocean LIDAR polarimetry system 10 to detect objects below the surface of a fluid (i.e., subsurface). System 10 may include a mobile platform 12, a light beam generator or LASER beam-projector assembly 14, which may also be referred to as beam-projector assembly, and a polarization-sensitive sensor or set of polarization-sensitive sensors 16 (which may also be referred generally to as a sensor, receiver circuitry, imager, or imaging sensor), a polarized laser beam 18 transmitted by the beam-projector assembly 14 and reflected signal radiation 19, which may also be referred to as radiation or light, from an object 22. The sensor may be a polarization-sensitive optical system with one or more imaging planes, or a set of such systems, such as, for example, a telescope with beam-splitting optics that direct light to two image planes sensitive to orthogonal polarizations of light. In one particular embodiment, the polarized beam 18 is directed downwardly into a fluid 20, such as the ocean or seawater, and the reflected radiation 19 is used to detect any object 22 that is located below the surface of the fluid 20. In one particular instance, the object 22 that is to be detected by system 10 is an object of interest. Notably, a LIDAR system incorporates a LASER with beam-projector optics, as well as one or more sensors, as well as electronics and software to coordinate the lasers and sensors and to capture the images.

Mobile platform 12 may be any moveable platform configured to carry the beam-projector assembly 14 and the polarization-sensitive sensor 16. In one particular embodiment, mobile platform 12 flies above the surface of the fluid 20 such that the beam-projector assembly 14 directs the beam 18 downwardly first through the air and then through the fluid 20. Mobile platform 12 may be any airborne vehicle, such as a helicopter, UAV, plane, or other aircraft either manned or unmanned. However, it is to be understood that the mobile platform 12 does not need to be an airborne platform. For example, the mobile platform 12 may be a vessel, UUV or towed device that floats on the fluid 20, that is either manned or unmanned, and carries the beam-projector assembly 14 and the polarization-sensitive sensor 16. In this instance, the polarized beam 18 generated by the beam-projector assembly 14 may not travel through air or the atmosphere prior to traveling through the fluid 20.

The LIDAR system 10 carried by the mobile platform 12 may include electronic circuitry to effectuate the generation of the beam 18 in order to survey distances to a target, such as the object 22 or the ocean floor 24, by illuminating that target with the polarized beam 18. The polarized light of beam 18 depolarizes at a finite rate as it moves through a multiple-scattering fluid 20. Backscatter tends to preserve polarization, so that a polarized beam backscattered from the scattering medium as the reflected radiation 19 is still polarized. The backscattered light depolarizes further as the beam transits the medium on the return path to the sensor, so that the net depolarization accumulates over the two-way path. For seawater, the depolarization rate is relatively slow, typically resulting in a decay of a completely polarized beam to 1/e polarization after approximately 7.5 scattering lengths. In clear ocean water, 7.5 scattering lengths can be 100 feet or more. This slow depolarization is not widely known, since it requires specialized equipment to measure. It should be noted that the range can be longer if the power-aperture product of the LIDAR is high enough where more power-aperture equals more range precision. The depolarization rate is likely to be at least as long for circularly polarized light and elliptically polarized light as for linearly polarized light. The ocean bottom 24 and many objects 22 depolarize the reflected light upon reflection. The depolarized reflections from the objects 22 of interest and the sea bottom 24 provide a means for discriminating objects of interest from water backscatter. Glints from surface returns are co-polarized with the laser. Thus, polarization of reflected light 19 can also be used to separate glints from objects of interest. Additional polarization information can be obtained with additional polarization-sensitive sensors at different polarizations, such as +/−45 degrees. The laser may also be circularly polarized, with the two polarization-sensitive sensors circularly polarized opposite each other, and elliptically polarized, with two polarization-sensitive sensors elliptically polarized opposite each other.

Typically, when using airborne imaging LIDAR to image underwater targets, the targets near the surface of the fluid 20 may be obscured by glints. Glints in the fluid 20 refer to small reflective flashes of light that interrupt the beam 18 and confuse or cause other difficulties for the polarization-sensitive sensor 16 in determining the return feedback of the laser beam in order to accurately map the target such as generating a 3D mapping of the ocean floor. The present disclosure addresses this concern by incorporating the polarization-sensitive sensor 16 that is polarized relative to the beam 18 to provide glint-free imaging for near surface objects.

The polarization-sensitive sensor 16 is a device carried by the mobile platform 12 that reads and records the return or reflected signal radiation 19 being returned to the LIDAR system 10 that is received by the polarization-sensitive sensor 16. The polarization-sensitive sensor 16 and the beam projector assembly 14 are typically co-located so as to have substantially overlapping fields of view and co-aligned look directions.

In one implementation, the polarization-sensitive sensor 16 may be a solid state detector, such as a silicon avalanche photo diode (APD). In another implementation, the polarization-sensitive sensor 16 may be a photo multiplier tube (PMT) or a streak-tube; however, the polarization-sensitive sensor 16 may be any suitable polarization-sensitive sensor.

Regardless of the type of polarization-sensitive sensor 16 implemented, it is polarized relative to the laser beam. In one particular embodiment, two polarization-sensitive sensors 16 are utilized, one of which is co-polarized (CoPol) while the other is cross-polarized (XrPol). The system 10 of the present disclosure measures the depolarization of the reflected radiation 19 in the fluid 20. Previous teachings and expectations would have believed that multiple scattering in the water or fluid 20 would depolarize the beam 18 and radiation 19 within about a few (one to three) scattering lengths such that deep targets or deep-water objects 22 would appear the same in both co-polarized (CoPol) and cross-polarized (XrPol) images. However, the present disclosure has discovered that the depolarization rate of the reflected radiation 19 sensed by the polarization-sensitive sensor 16 relative to the polarized beam 18 generated by the beam-projector assembly 14 is about 7.5 scattering lengths, which is typically about 80 feet in seawater, but can be up to 100 feet or more in clear seawater. This achievement provided improved results versus the previous teachings based on the structure of system 10. Reflected radiation 19 from the bottom or ocean floor 24 empirically behaved as expected and the ocean floor 24 depolarizes the beam 18 almost completely.

Because objects 22 in the water column or fluid column depolarize the reflected radiation 19 while backscatter reflection from the fluid itself preserves polarization, the contrast of the objects 22 from the reflected radiation 19 versus reflections from the water background is very high, even at low signal levels. This greatly increases the signal to noise and clutter ratio (SNCR) for detecting and classifying objects 22. Accordingly, a polarization-sensitive sensor 16 or set of polarization-sensitive sensors 16 may be coupled with the light generator (i.e., the polarized LASER beam-projector assembly 14) carried by the platform 12 flying above the fluid 20, wherein the light generator generates light (i.e., the beam 18) directed into the fluid 20. The sensor is coupled with scatter detection logic to sense scatter in the reflected radiation 19 having reflections from the object as well as from the fluid. Additionally, object detection logic may be coupled with the scatter detection logic to determine whether an object 22 is present in the fluid 20 based, at least in part, on the scatter in the reflected radiation 19.

With continued reference to FIG. 1, and in one example, system 10 characterizes the depolarization rate of the fluid. This requires a highly-polarized light source (i.e., beam projector assembly 14) and two or more polarization-sensitive sensors 16, at least one of which is co-polarized (CoPol) with the laser and at least one of which is oppositely-polarized versus the laser. For water characterization, the polarization-sensitive sensors 16 are aligned to have overlapping (such as identical) fields of view. The polarization extinction ratios of orthogonal polarization directions, and the dynamic ranges of the polarization-sensitive sensors 16, should be sufficient to discriminate small polarizations of backscattered light. The sensors in one example are also gated or time-resolved, so that LIDAR-return intensity versus range can be measured for each polarization-sensitive sensor 16. The water 20 is characterized by collecting intensity-versus range from the reflected radiation 19 in the two polarization-sensitive sensors 16, and computing from their ratios or differences (a) the depolarization rate of the medium versus time or distance, (b) the overall attenuation rate of light in the medium versus time or distance, and (c) the presence and depolarization properties of the sea bottom (if present).

System 10 uses the data from the characterization to set polarized-LIDAR sensor parameters (time delays, integration times, gains, etc.) so as to optimally measure the reflections of water, the sea bottom, and of any objects 22 intervening between the water surface and the sea bottom 24. Reflected signal radiation 19 from an object 22 will appear more cross-polarized (XrPol) than the water, compared to the water backscatter. The reflected signal radiation 19 from the object 22 will also typically appear less cross-polarized (XrPol) compared to the sea bottom 24.

The discrimination of objects of interest versus the natural background can be done with both polarization-sensitive sensors 16 set to the same depths/ranges, or with them set to different depths/ranges. The ranges are limited by the power of the laser transmitter, the sensitivity of the sensors, and the fineness of polarization discrimination the sensor can provide. For example, greater laser power provides detection and range estimation at longer ranges.

Detection of objects 22 versus the water backscatter can also be accomplished with just one polarization-sensitive sensor 16 polarized oppositely, i.e., cross-polarized (XrPol), versus the transmitted beam. Operation with a single cross-polarized (XrPol) polarization-sensitive sensor 16 provides detection, due to the enhanced SNCR of the depolarizing object versus polarized water backscatter, but provides more limited range-precision advantages over a standard unpolarized range-gated LIDAR system.

Figure 2:
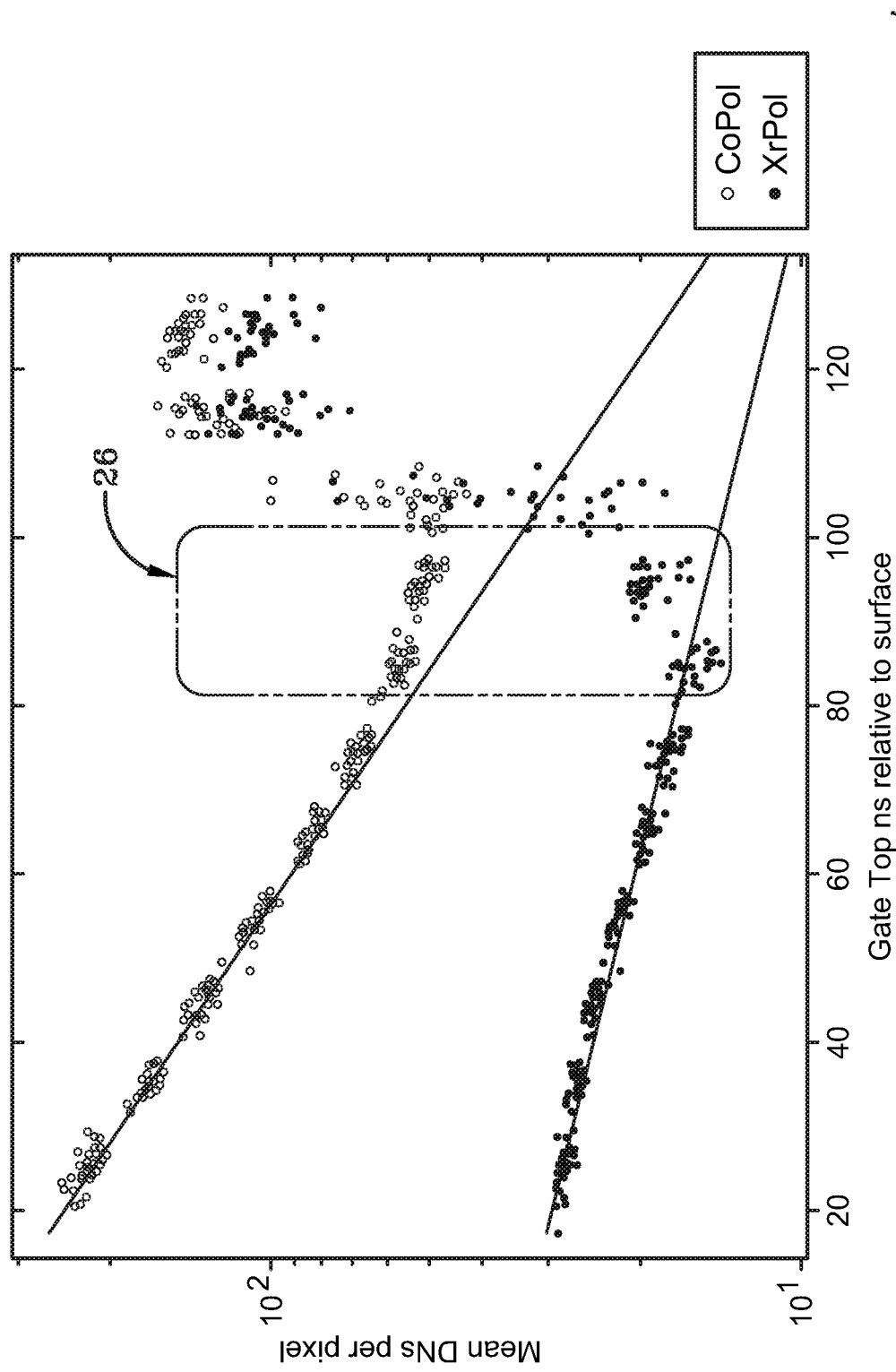
FIG. 2 (FIG. 2) is a graph of scatter results of co-polarized data and cross-polarized data for the mean in units of digital numbers (DNs) per pixel versus gate top time-delays in nanoseconds relative to the surface.

To illustrate the phenomena exploited by the present disclosure, FIG. 2 depicts a graph of empirical data for a very shallow water (VSW) case for co-polarized (CoPol) and cross-polarized (XrPol) polarization-sensitive sensors 16 relative to the beam-projector assembly 14. More particularly, the empirical data related to the polarization type relative to beam 18. The graph depicts the mean Digital Number (DN) per pixel. The accumulated number of photons in each pixel is represented by the DN count output from an analog to digital converter in the sensor electronics. The X-axis represents the gate top in nanoseconds (ns) relative to the surface. The data of FIG. 2 indicates that for the co-polarized (CoPol) and cross-polarized (XrPol) polarization-sensitive sensor 16, there appears to be a layer of enhanced back scatter above the sea bottom approximately six to seven feet thick. Furthermore, it is revealed that the turbidity of the fluid 20 will reduce apparent reflectance of the bottom or ocean floor 24. The K-value for the co-polarized (CoPol) measurements is 0.11/m for a 30 ns gate. The K-value for the cross-polarized (XrPol) data is 0.08 per meter. The scattering layer above the ocean floor 24 is represented by box 26. Stated otherwise, FIG. 2 presents data supporting two phenomena exploited by the present disclosure: 1) the slow depolarization of LIDAR returns versus range and scattering, and 2) the complete depolarization of laser light reflected from the sea-bottom.

Figure 3:
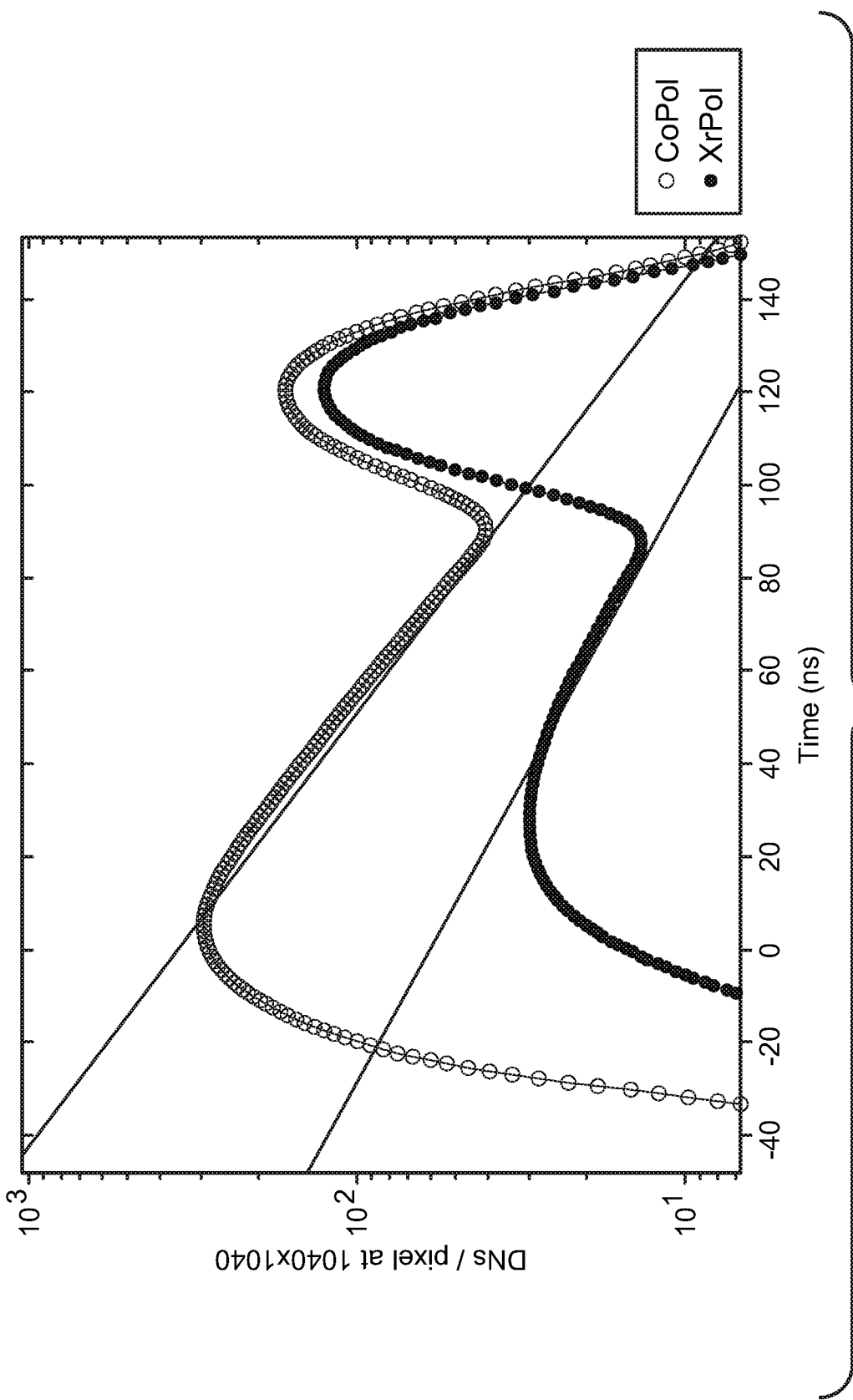
FIG. 3 (FIG. 3) is a scatter graph of numerically-modeled data for co-polarized and cross-polarized results of the DNs per pixel versus time, showing trends in attenuation rate in the water volume, as well as large de-polarization peaks from sea-bottom reflections.

FIG. 3 represents results of a physics-based numerical model of gated LIDAR median DNs per pixel versus gate time relative to the surface. The computation includes the new teaching of a slow depolarization rate. The K-value for the co-polarized (CoPol) data is 0.1 per meter (0.1/m) and the K-value for cross-polarized (XrPol) data is 0.08 per meter (0.08/m), with the water column being modeled as uniform and un-stratified. The results of FIG. 3 were generated when the ocean floor 24 had a depth of 50 feet with a reflectance equal to 24%, Lambertian, with 1% variability over 0.1 meter patches. The model depolarization parameter equals 0.86, (1.0 equals no depolarization, 0 equals complete depolarization) or about 0.14 per scattering length. Thus, the modeled LIDAR returns of FIG. 3 indicate that the depolarization length of 7.5 scattering lengths is about equal to 1/e.

Figure 4:
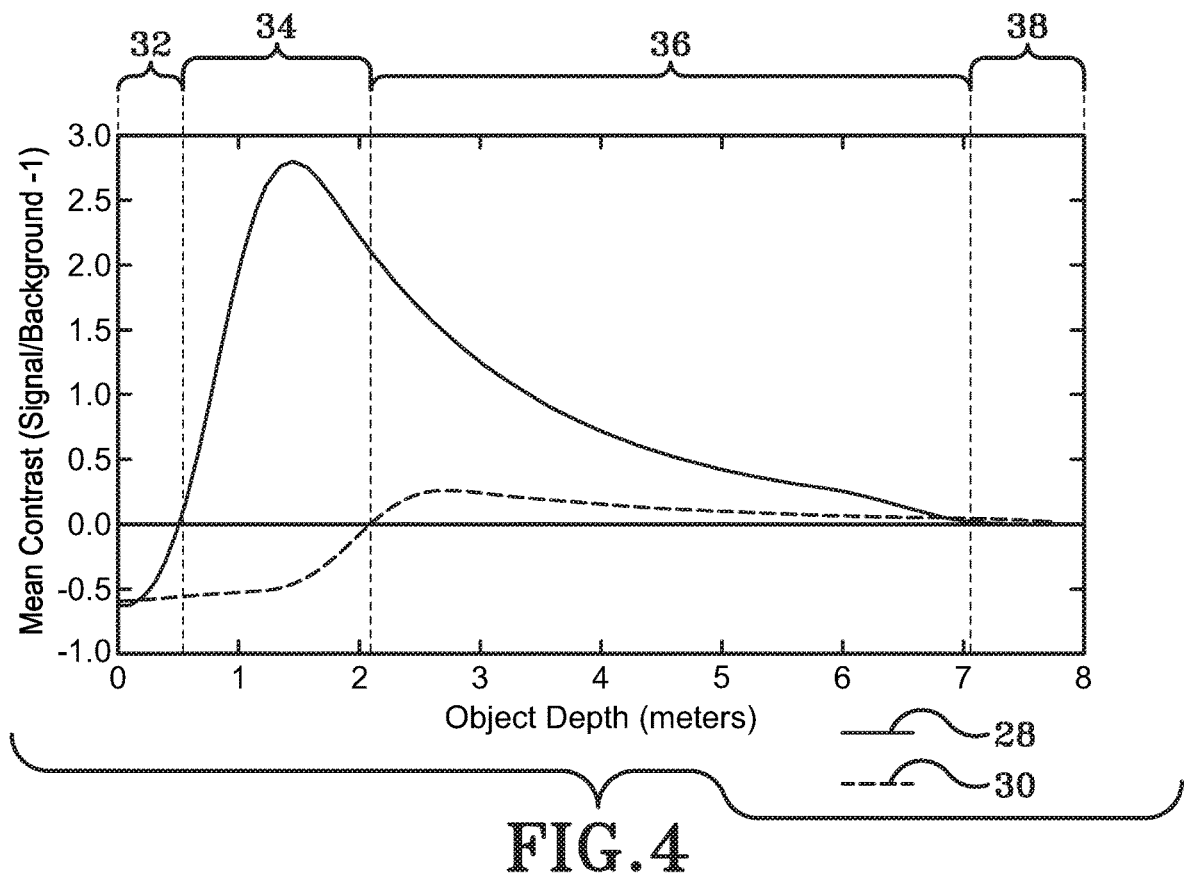
FIG. 4 (FIG. 4) is a graph depicting computed gated-LIDAR mean contrast versus object depth in meters for an exemplary case of a cross-polarized (XrPol) polarization-sensitive sensor gated shallow and a co-polarized (CoPol) polarization-sensitive sensor gated deeper than the cross-polarized (XrPol) polarization-sensitive sensor.

FIG. 4 plots computed gated-LIDAR contrast versus object depth for an exemplary case of a cross-polarized (XrPol) polarization-sensitive sensor 16 gated shallow and a co-polarized (CoPol) detector 16 gated deeper than the cross-polarized (XrPol) polarization-sensitive sensor 16. A cross-polarized (XrPol) contrast curve is depicted as 28 and a co-polarized (CoPol) contrast curve is depicted as 30. In this example, both gates of the polarization-sensitive sensors 16 are 5.6 meters wide, with the start of the gate of the cross-polarized (XrPol) polarization-sensitive sensor 16 set to 1.12 meters and the start of the gate of the co-polarized (CoPol) polarization-sensitive sensor 16 set to 2.24 meters. In this example, the polarized laser pulse had a duration of 8.3 nanoseconds. As depicted in FIG. 4, a first region 32 depicts when both gates of the cross-polarized (XrPol) and co-polarized (CoPol) polarization-sensitive sensors 16 are in shadow (i.e., the object is shallower than the gate start depth). A second region 34 depicts when the gate of the cross-polarized (XrPol) polarization-sensitive sensor 16 shows reflection (i.e., the object 22 is between the start and end of the gate) and when the gate of the co-polarized (CoPol) detector 16 is in shadow. A third region 36 depicts when both gates of the cross-polarized (XrPol) and the co-polarized (CoPol) detector 16 show reflection. A fourth region 38 depicts when the gate of the co-polarized (CoPol) polarization-sensitive sensor 16 shows reflection. As depicted in FIG. 4, a "knee" near the object depth of 1.5 meters in the deeper co-polarized (Co-Pol) contrast curve indicates the beginning of an extended monotonic DOLP versus depth region.

Figure 5:
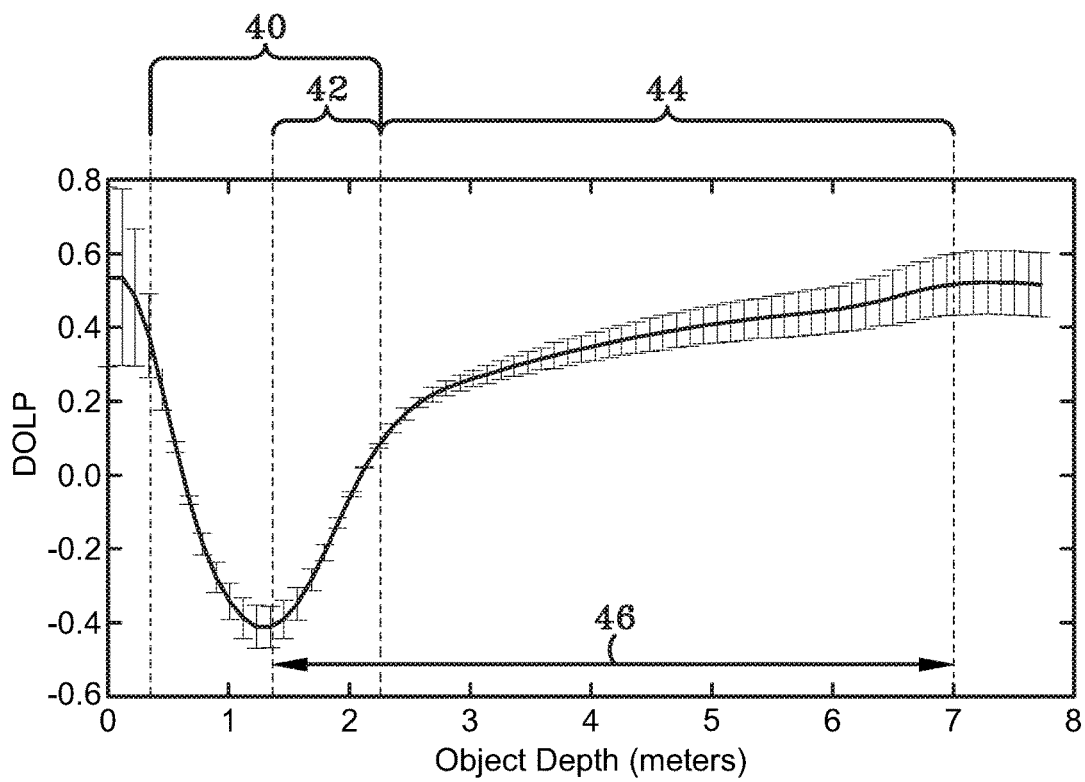
FIG. 5 (FIG. 5) is a graph depicting DOP computed from the simulated LIDAR returns shown in FIG. 4 versus object depth in meters.

FIG. 5 is a graph depicting DOLP computed from the simulated LIDAR returns shown in FIG. 4 versus object depth in meters. For depth ranges over which the DOLP versus depth curve is monotonic, look-up tables are created to compute depth from DOLP. In this example, a fifth region 40 depicts when the gate of the cross-polarized (XrPol) polarization-sensitive sensor 16 shows reflection and the gate of the co-polarized (CoPol) polarization-sensitive sensor 16 is in shadow. A sixth region 42 depicts an extended DOLP-from-depth region. A seventh region 44 depicts a main DOLP-from-depth region where both gates of the cross-polarized (XrPol) and co-polarized (CoPol) polarization-sensitive sensors 16 show reflection. The largest region of monotonic DOLP occurs in the seventh region 44. An eighth region 46 depicts a monotonic DOLP versus object depth region. The monotonic DOLP versus object depth region is extended on the shallow end of the range by analyzing a region where one gate is nominally in shadow (the object is shallower than the gate start depth) and the other gate shows a reflection (object between the gate start and gate end depth). This extended DOLP-from-depth region exploits the finite (greater than zero) polarized-laser pulse width. Other combinations of gate width, gate placement, and laser pulse shapes, among other things, will also yield useful DOLP vs depth characteristics. For example, gate durations, start times, and end times, encompassing range spans greater than the desired final range precision may be selected. As such, the gates may span several meters of range, and still allow range precision to a fraction of a meter. In an extreme case, the gates may encompass the entire scattering medium thickness, from the sensor to below the underlying bottom.

Figure 6:
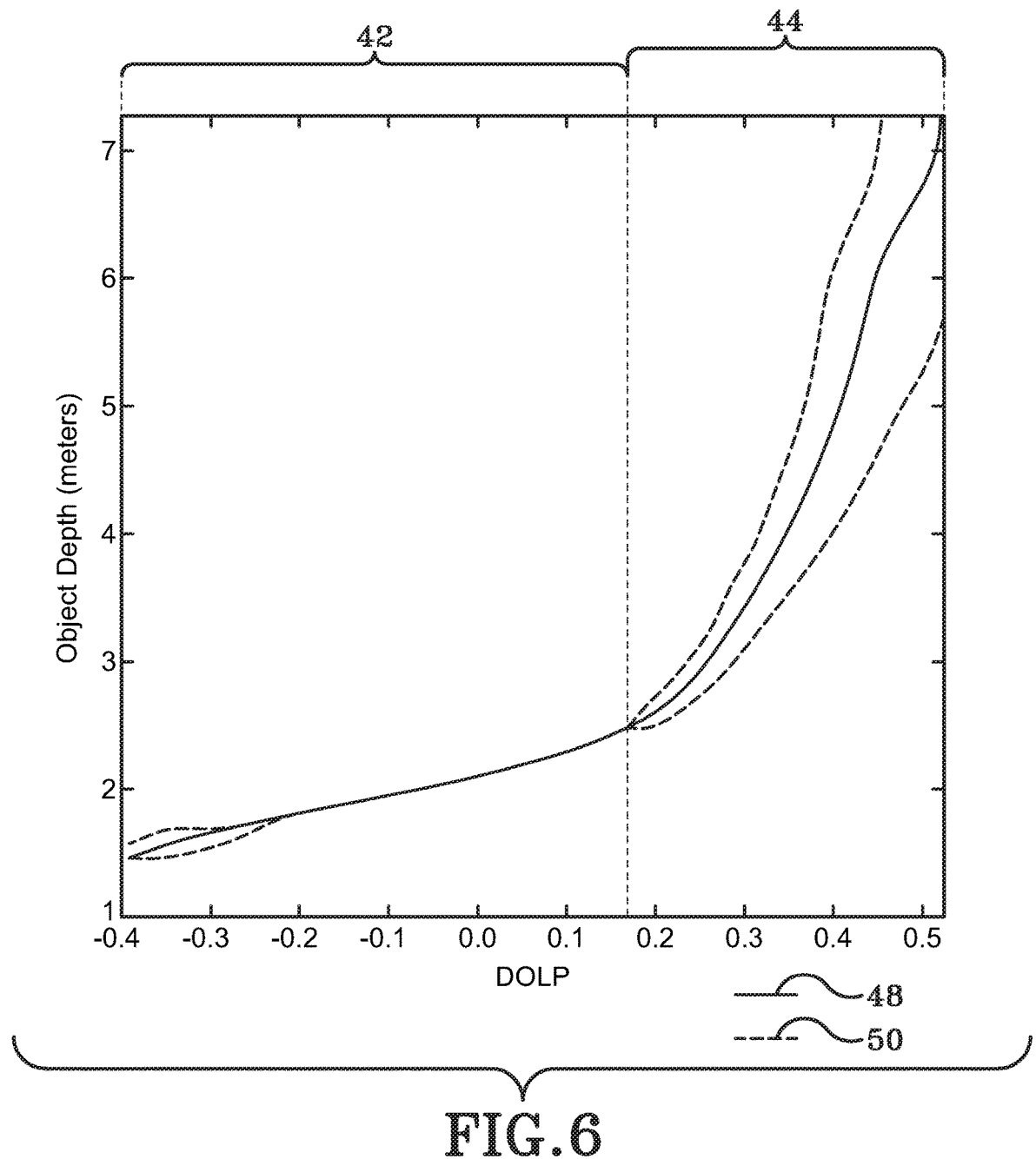
FIG. 6 (FIG. 6) is a graph depicting object depth in meters from a DOP look-up curve computed from the data shown in FIG. 5, with one-standard deviation ($1\sigma$) errors shown as dashed lines.

FIG. 6 is a graph depicting object depth in meters from a DOLP look-up curve computed from the data shown in FIG.

5, with depth shown as a solid line 48 and one-standard deviation (1σ) errors shown as dashed lines 50. The sixth region 42, which is the extended DOLP-from-depth region, and the seventh region 44, which is the main DOLP-from-depth region from FIG. 5 is also correspondingly shown in FIG. 6. Even though the range gates of the polarization-sensitive sensors 16 are 5.6 meters thick, much finer localization (e.g., σ<1 meter) is attained in the range from 1.5 to 5 meters.

In accordance with one aspect of the present disclosure, the system 10 takes advantage of the natural depolarization of a laser beam 18 and reflected radiation 19 moving through seawater via scatterings. Because water scattering and absorption varies with geographic location, time of year, and many other factors, the depolarization rates must be determined empirically, by operating the LIDAR system in an environmental-characterization mode. The LIDAR attenuation and depolarization rates are empirically determined from the apparent gain between multiple polarized sensors (e.g., co-polarized (CoPol) and cross-polarized (XrPol)) as a function of depth, or between a single polarized sensor and numerical model of unpolarized light attenuation versus depth. The depth, brightness, and polarization of bottom reflections are also determined in this mode, if the bottom is visible. In some instances, relative gain may be estimated by requiring the co-polarized (CoPol) and cross-polarized (XrPol) values be equal at deep depths. However, if the data does not go deep enough, then the estimation may misleadingly yield a faster-than-true depolarization rate estimate. This may lead to an overestimate of predicted cross-polarization (XrPol) shadow contrasts on the sea bottom and an underestimate of cross-polarization (CoPol) reflection contrast in the water volume. In accordance with one aspect of the present disclosure, the structure of system 10 demonstrated environmental characterization, with collected data from experiments of depolarization data for deep water (DW) and very shallow water (VSW). With correct known gains, the depolarization rate is about 7.5 scattering lengths in both DW and VSW. In VSW, the ocean bottom depolarization is about 100%. Additionally, when the objects 22 are opaque, depolarization on reflection was verified to be significantly greater than water depolarization. Cross-polarization (CoPol) provides high reflection contrast even at deep depths, especially when water-volume signal is very low.

Objects 22 in the scattering medium will typically depolarize the transmitted beams 18 relative to the water backscatter, and have a high cross-polarization (CoPol) contrast with low noise. Most solid objects 22 in water completely depolarize the reflected radiation 19. In these instances, the cross-polarized (XrPol) polarization-sensitive sensor 16 may be run at range-gate widths and depths set to avoid including water-bottom-returns while providing sufficient signal for object detection. The gate widths and depths are set according to the environmental characterization determined in the characterization mode. The in-water cross-polarized (XrPol) signal returns are typically significantly less than the co-polarized (CoPol) returns. The co-polarized (CoPol) gate widths and depths may be set to either include or not include the ocean bottom, depending on whether on-bottom objects 22 are of interest.

With known depolarization of light reflected from in-water objects 22, together with the water optical properties determined from the water-characterization data, the net object-plus-water LIDAR return is modeled. The modeled inputs include the properties of the polarized laser pulse, including, but not limited to, pulse shape versus time. The modeled inputs also include the properties of the polarization-sensitive sensor 16 gates, including gate shape, gate durations, and start/stop depths.

The gate durations and start/stop depths are determined by a system operator according to the needs of the particular application, which typically extend beyond precise range determination. Thus, the DOP-to-range method is designed to accommodate LIDAR sensing modes that may not be fully optimized for range determination. For DOP estimation, only the relative brightness of the LIDAR returns is needed, so that an absolute photometric calibration of LIDAR intensity is not required.

System 10 is designed to allow very little undesired polarization into each polarized-polarization-sensitive sensor channel. This is quantified by the extinction ratio of the undesired versus the desired polarization. It is preferred that the extinction ratio be less than 0.2%, though higher ratios can work with degraded signal to noise ratio (SNR). With very low extinction ratios, the cross-polarized (XrPol) channel will be used in highly glinty conditions to minimize glint interference. Very low extinction ratios also allow for accurate estimates of water depolarization rates. Very low extinction ratios also provide high-contrast cross-polarized (XrPol) reflections (as opposed to shadows) for in-water or subsurface objects 22. This is because there is little back scatter in the cross-polarized (XrPol) signals from the water, while opaque objects 22 are observed to depolarize the LIDAR returns. The SNR of system 10 may be improved if the system is able to increase optical sensitivity to maximize the cross-polarization (XrPol) contrast and depth range. Furthermore, SNR may be improved if the laser tail is shortened to improve the co-polarization (CoPol) performance by minimizing surface glints in the co-polarized (CoPol) images. Furthermore, an SNR may be improved when algorithms or other processes are developed for computing and mitigating water stratification near the bottom or ocean floor 24.

Figure 7:
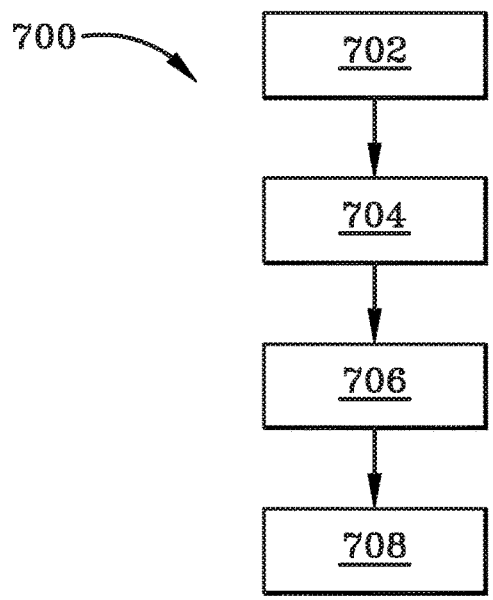
FIG. 7 (FIG. 7) a flowchart depicting one method in accordance with one aspect of the present disclosure.

FIG. 7 depicts a method of detecting an object in a fluid generally at 700. The method 700 in one example includes coupling at least two polarization-sensitive sensors to a polarized light source, wherein the at least two polarization-sensitive sensors are polarized relative to polarized light generated by the light source, which is shown generally at 702. The method 700 in this example further includes transmitting the polarized light from the light source into a fluid column, which is shown generally at 704. The method 700 in this example includes characterizing a depolarization rate of the fluid column, which is shown generally at 706. The method 700 in this example includes determining whether an object is present in the fluid column based, at least in part, on the depolarization rate, which is shown generally at 708. Method 700 in this example further provides wherein at least one polarization-sensitive sensor is co-polarized (CoPol) with the polarized light and at least one polarization-sensitive sensor is oppositely-polarized with the polarized light. Method 700 in this example further provides aligning the at least two polarization-sensitive sensors to have overlapping fields of view. Method 700 in this example further provides discriminating small polarizations of backscattered light with extinction ratios of orthogonal polarization directions, and dynamic ranges of the at least two polarization-sensitive sensors. Method 700 in this example further provides gating (time-delaying) the at least two polarization-sensitive sensors to measure return light versus range. Method 700 in this example further provides characterizing the fluid column by collecting intensity versus range ratio in the at least two polarization-sensitive sensors; and computing at least one of (a) the depolarization rate of the medium versus time or distance, (b) the overall attenuation rate of light in the medium versus time or distance, and (c) the presence and depolarization properties of the sea bottom (if present), based at least in part on the intensity versus range ratio. Method 700 in this example further provides successively time-delaying (range gating) image pairs from the at least two polarization-sensitive sensors to quantify the depolarization rate. Method 700 in this example further provides utilizing data from the characterization to set polarization-sensitive sensor parameters to optimally measure reflections of the fluid column, a sea floor, and of any objects intervening between the light and the sea bottom. Method 700 in this example further provides discriminating the object against the sea floor with at least two polarization-sensitive sensors set to one of (a) similar depths, and (b) different depths. Method 700 in this example further provides detecting the object with one polarization-sensitive sensor from the at least two polarization-sensitive sensors, wherein the one polarization-sensitive sensor is oppositely polarized versus the polarized light. Method 700 in one example further provides flying a platform above the fluid column, wherein the platform carries the light source such that light is projected from an elevated altitude above the fluid column; with polarization-sensitive sensors having sufficient extinction ratio to characterize depolarization lengths of the light at least 7.5 times the scatter length of the light in the fluid column; and wherein the light source is a LIDAR, the light is a polarized laser beam, and the polarization-sensitive sensor is cross polarized (CoPol) relative to the laser beam generated by the LIDAR.

Figure 8:
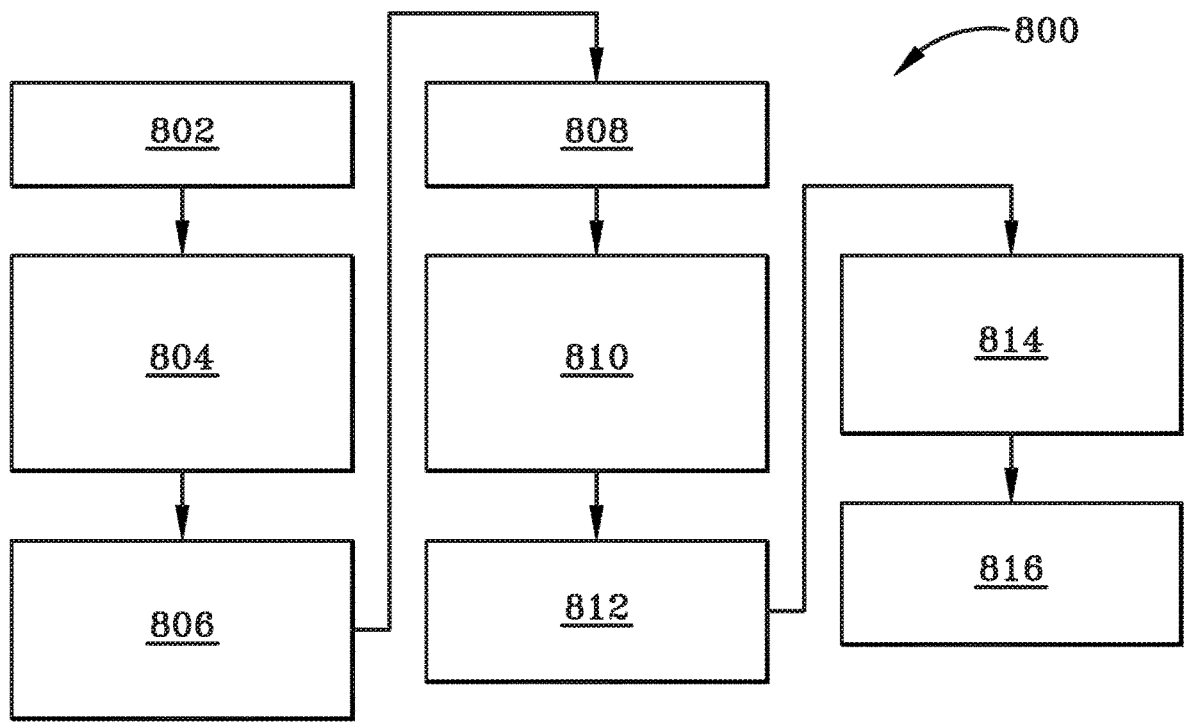
FIG. 8 (FIG. 8) is a flowchart depicting another method in accordance with one aspect of the present disclosure.

FIG. 8 is a flowchart depicting a method in accordance with one aspect of the present disclosure generally at 800. The method 800 in this example includes transmitting a laser pulse at a first time, such as t0, which is shown generally at 802. The method 800 in this example includes recording at least one set of polarized LIDAR images at multiple time delays relative to the first time t0, which is shown generally at 804. The method 800 in this example includes computing trends in intensity versus time delay for each polarization channel (i.e., the cross-polarization (XrPol) channel and the co-polarization (CoPol) channel), which is shown generally at 806. The method 800 in this example includes identifying the de-polarizing bottom, if the bottom is present relative to the time delays or depth, which is shown generally at 808. The method 800 in this example includes computing the attenuation rates between the ocean or water surface and the bottom for the different polarization directions, which is shown in generally at 810. The method 800 in this example includes computing the depolarization rate of the water, which is shown generally at 812. The method 800 in this example includes setting the sensor or focal plane array (FPA) gates for the bottom depth, water attenuation, and water depolarization, which is shown generally at 814. The method 800 in this example includes using the gated sensor(s) or FPA(s) to search for objects 22 of interest, which is shown generally at 816.

Figure 9:
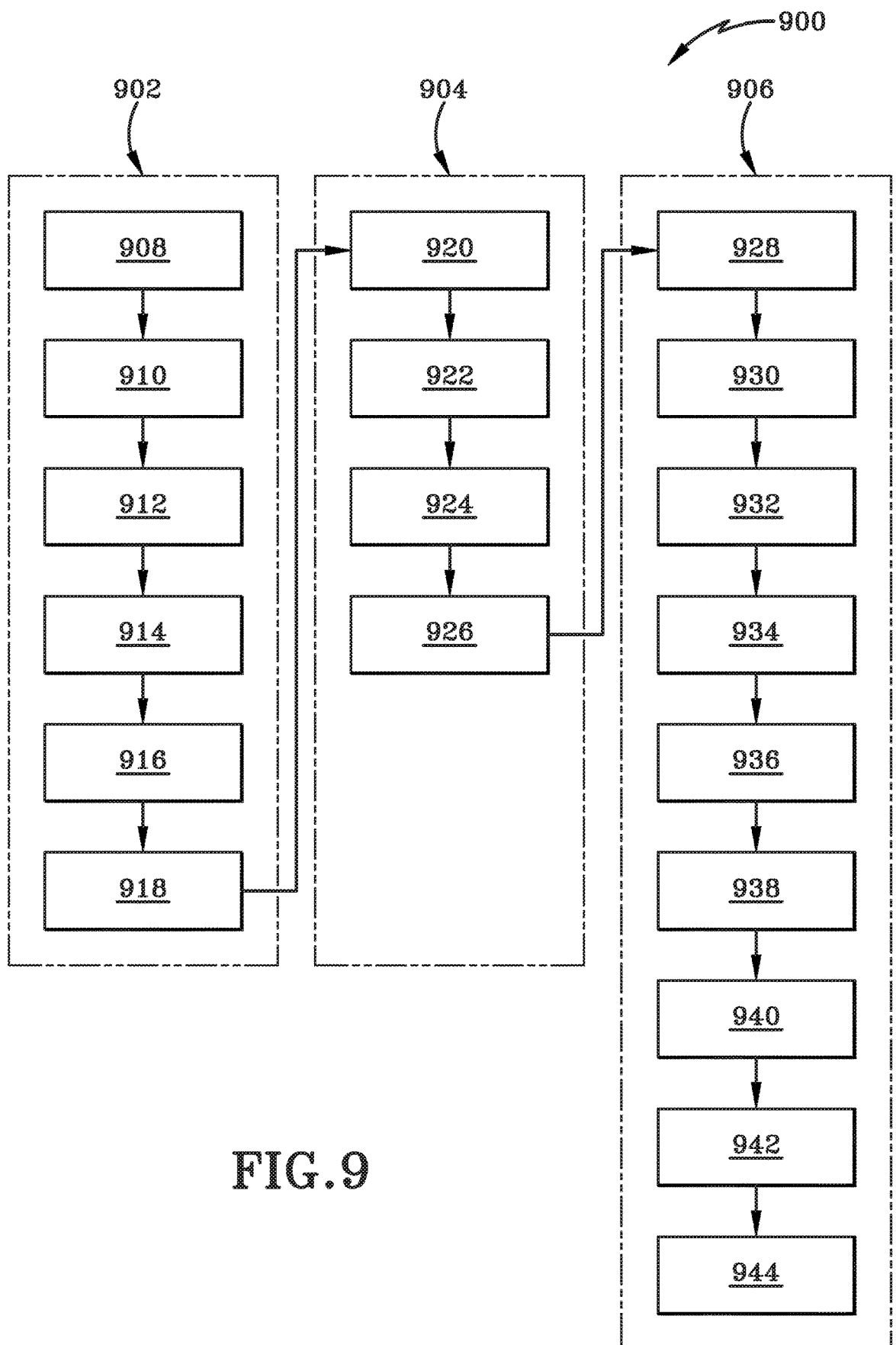
FIG. 9 (FIG. 9) is a flowchart depicting another method in accordance with one aspect of the present disclosure.

FIG. 9 is a flowchart depicting a method a method for determining a range to an object in a fluid generally at 900. The method 900 in this example includes operably engaging an imager to a polarized light source, which is shown generally at 902. The method 900 includes generating polarized light via the polarized light source, which is shown generally at 904. The method 900 in this example includes polarizing the imager relative to the polarized light, which is shown generally at 906. The method 900 in this example includes transmitting the polarized light from the polarized light source into the fluid, which is shown generally at 908. The method 900 in this example includes receiving reflected polarized light from the object, which is shown generally at 910. The method 900 in this example includes characterizing a depolarization rate of the fluid, based, at least in part, on the reflected polarized light, which is shown generally at 912. The method in this example includes determining the range to the object, based, at least in part, on the depolarization rate of the fluid, which is shown generally at 914. The generated polarized light may be linearly polarized, circularly polarized, and/or elliptically polarized, and/or a combination of linearly, circularly, and/or elliptically polarized.

In one example, the method 900 further includes utilizing a single image plane of the imager to receive the reflected polarized light from the object where the single image plane includes an array of polarization-selective pixels, which is shown generally at 916. In another example, the method 900 further includes utilizing at least two polarization-sensitive sensors of the imager to receive the reflected polarized light from the object, which is shown generally at 918.

In one example, the method 900 further includes linearly co-polarizing one of the at least two polarization-sensitive sensors relative to the polarized light and linearly cross-polarizing one of the at least two polarization-sensitive sensors relative to the polarized light, which is shown generally at 920. In another example, the method 900 includes circularly co-polarizing one of the at least two polarization-sensitive sensors relative to the polarized light and circularly cross-polarizing one of the at least two polarization-sensitive sensors relative to the polarized light, which is shown generally at 922. In yet another example, the method 900 further includes elliptically co-polarizing one of the at least two polarization-sensitive sensors relative to the polarized light and elliptically cross-polarizing one of the at least two polarization-sensitive sensors relative to the polarized light, which is shown generally at 924.

The method 900 in this example includes transmitting the polarized light from the polarized light source into the fluid over successive time delays, which is shown generally at 926. The method 900 in this example includes collecting at least one set of polarized images from a plurality of the successive time delays, which is shown generally at 928. The method 900 in this example includes computing a polarization intensity versus range, based, at least in part, on the at least one set of polarized images, which is shown generally at 930. Characterizing the depolarization rate of the fluid may be based, at least in part, on the polarization intensity versus range. The method 900 in this example includes computing an overall attenuation rate of the transmitted polarized light in the fluid based, at least in part, on the polarization intensity versus range, which is shown generally at 932. The method 900 in this example includes computing a scattering rate of the fluid based, at least in part, on the polarization intensity versus range, which is shown generally at 934. The method 900 in this example includes computing, if present, depolarization properties of a bottom underlying the fluid based, at least in part, on the polarization intensity versus range, which is shown generally at 936.

The method 900 in this example includes further includes generating a lookup table containing values of range versus degree of polarization (DOP), which is shown generally at 938. In one example, generating the lookup table containing values of range versus DOP is accomplished via numerical modeling. The method 900 in this example includes setting parameters of the numerical modeling based, at least in part, on the depolarization rate of the fluid to optimize the numerical modeling of the range versus DOP, which is shown generally at 940. In another example, generating the lookup table containing values of range versus DOP is accomplished via compiling known values of range versus DOP. The method 900 in this example includes gating the at least two polarization-sensitive sensors, which is shown generally at 942. The method 900 in this example includes selecting a desired final range precision value and selecting gate parameters of the at least two polarization-sensitive sensors to encompass range spans greater than the desired final range precision value, which is shown generally at 944.

In operation, the LIDAR polarimetry system 10 takes advantage of the fact that polarized light projected into water depolarizes relatively slowly. The present disclosure exploits the relatively slow depolarization rate of the beam moving through the water to identify objects 22 beneath the ocean surface and will additionally characterize the attenuation rate and depolarization rate of the light in the water. The attenuation rate is the rate at which light appears to dim in the water. The depolarization rate is the rate at which the light depolarizes as it moves through the water.

The system 10 is configured to measure the depolarization rate which can vary relative to the scattering length of the light through the water. Particularly, the scattering length can vary depending upon the ocean conditions and other factors. For example, if a beam of light is projected in the water and it is measured as to how much it dims over a distance, the attenuation rate can be determined. Typically, a clear ocean attenuation rate is about 5% or 10% per meter. As the light attenuates, it also scatters. The scattering rate is determined with a beam transmissometer, which has a narrow field of view to reject scattered light and is thus able to observe the unscattered light. The device can determine the scattering rate, which is typically in a range from about 10% to 80% per meter for ocean water. The scattering rates are typically much higher than the attenuation rates. Stated otherwise, the rate at which light scatters is higher than the rate at which light is attenuated through the fluid column.

Scattering of the light depolarizes the light as the light moves through the fluid column. More particularly, the accumulation of multiple scatterings significantly depolarizes the light as it moves through the fluid column. In accordance with one aspect of the present disclosure, these aspects of the light behavior can be exploited by polarizing at least one sensor, such as polarization-sensitive sensor 16 in system 10. More particularly, the polarization-sensitive sensor 16 may include one sensor that is polarized with the polarization direction of the beam and a second sensor that is cross-polarized (CoPol) relative to the polarization of the beam. This establishes an attenuation rate that is different relative to each sensor or as observed by each sensor. In one particular embodiment, for the cross-polarized (XrPol) sensor, the attenuation is less than the attenuation for the co-polarized (CoPol) sensor.

In operation, as the beam of light is transmitted through the water, some of the polarized light from the polarized beam is converted into light in the cross-polarized (XrPol) direction. The conversion from the co-polarized (CoPol) direction to the cross-polarized (XrPol) direction occurs relatively slowly. The light also depolarizes when it contacts an object. For example, if the polarized light contacts the ocean bottom, it depolarizes almost 100% upon that reflection. The depolarization is near 100% due to the rough surface of the ocean bottom. Depolarization refers to converting some of the light from one polarization to the other. Stated otherwise, the amount of light in two opposite orthogonal polarizations is equal. Once the two polarization directions have equal intensities, and as the light is scattered, light will continue to convert between opposing orthogonal polarizations in equal amounts as is occurring in the other direction.

Similar to the ocean floor 24, objects 22 also depolarize the polarized beam as it moves through the fluid column upon contact. Objects 22 also include microscopic rough surfaces that behave similar to an ocean bottom. In one particular embodiment, the microscopic rough surface of an object 22 is on a scale of about one wavelength of light. Thus, if the object 22 is shallow enough in the water and there is not much depolarization of the beam moving through the water, then the light that contacts the object 22 will significantly depolarize the beam and the contrast as observed by the sensor in the cross-polarization (XrPol) direction will be much higher.

Single backscatter events in the water will preserve polarization. Thus, in the co-polarization (CoPol) channel, the sensor will detect some photons in some amount, and, at the object 22, the sensor will detect an amount of photons proportional to the reflectance of the light at the object 22 of interest. The contrast is dependent on how large the gate of the sensor is accepting. In the cross-polarization (XrPol) direction, the cross-polarization (XrPol) channel at the sensor will detect a high amount of contrast at the object 22 and a very little amount of contrast from the water itself. Thus, the contrast can be enhanced in the cross-polarization (XrPol) direction. The system 10 is further able to enhance and filter various clutter by comparing cross-polarization (XrPol) and co-polarization (CoPol) channels or directions. For example, if there are glints, which are typically polarized in the same direction as the laser beam 18, and if something is observed in the co-polarization (CoPol) channel but not in the cross-polarization (XrPol) channel, then the system 10 is able to determine that it is a glints or a clutter. However, if something is observed or determined in the cross-polarization (XrPol) channel, the system 10 can note the object 22 as an object as opposed to a glints, because the object 22 depolarized the beam. Thus, the system 10 is able to discriminate false alarms, such as glints, wave focusing events, foam patches, or other naturally occurring events in the ocean from objects 22 of interest.

The object 22 will have a significant amount of light intensity in both the co-polarization (CoPol) channel and the cross-polarization (XrPol) channel. The water 20, until very deep, has low intensity in one of the channels. This establishes a high difference in contrast which allows the object 22 to be detected based on a high SNR.

The depth of the water 20 applicable to the system 10 depends upon the attenuation rate and the scattering length of the light in the water. For example, in a coastal area, the scattering length may be about five feet. Thus, seven and one-half scattering lengths may be about 37.5 feet. However, in the open ocean, in may be much deeper.

The scattering, attenuation, and depolarization rates are characteristic of each particular fluid. For known fluids, the depolarization rate may be derived from the attenuation and scattering rates, measured independently, or inferred from historical or previously-acquired data.

The beam-projector assembly 14 operates in conjunction with the aircraft 12 moving above the surface of the water 20 (or which may also be a vessel atop the surface of the water or below the surface of the water). In one example, the polarization-sensitive sensor 16 may be closely adjacent the beam-projector assembly 14 or may be co-boresighted with the beam-projector assembly 14. The polarization-sensitive sensor 16 includes a lens that is oriented in the same direction as the beam-projector assembly 14 and accepts light therein from an area of the ocean has been illuminated by the laser beam 18. The beam-projector assembly 14 transmits a laser pulsed beam 18 and a timer is started when the beam 18 is transmitted. The light of beam 18 is timed by the timer and the polarization-sensitive sensor 16 is turned on at a certain time. Typically, there is a slight delay between when the beam 18 is transmitted and when the polarization-sensitive sensor 16 is turned on in order to avoid viewing the air between the aircraft and the top surface of the water (when the LIDAR system 10 is carried by an aircraft). When the system 10 of the present disclosure is floating with a vessel, there may not be a need to have the same delay. The timer may digitize every nanosecond, or another time frame, similar to that of a photo multiplier tube, or it may use a gated imager which starts a certain exposure at a certain time and stops the imager at a certain time. For example, a gated imager (which is also considered a polarization-sensitive sensor 16) may start when the beam 18 contacts the ocean surface and may stop when the beam 18 is a certain distance below the ocean surface.

In one example, a telescope is used in conjunction with the polarization-sensitive sensor 16, which has been gate determined and directs the received light to a beam splitter inside the polarization-sensitive sensor 16. The beam splitter of polarization-sensitive sensor 16 directs one polarized direction to a focal plane and directs the other polarization direction to a second focal plane. Polarization directions of the beam splitter must be aligned so that they are with and against the polarization direction of the laser beam that was transmitted. The polarization-sensitive sensor 16 can further record the data and send the data to a processing facility, such as a computer, to process the information to determine whether an object 22 was present beneath the ocean surface. Thus, the polarization-sensitive sensor 16 captures two images that may be compared by the processor in the computer or another functionality of the computer to determine the presence of an object 22 beneath the ocean surface. In another embodiment, the sensor does not include a beam splitter, but instead uses a single image plane which includes a suitable array of polarization-selective pixels. The polarization-selective pixels are utilized to select from linearly polarized pixels, circularly polarized pixels, elliptically polarized pixels, and/or a combination of linearly, circularly, and/or elliptically polarized pixels.

In one example, one telescope is closely adjacent or co-boresighted with the laser beam generator 14. The beam splitter of the polarization-sensitive sensor 16 is in operative communication with the telescope lens that receives light therein. The beam splitter, and in one particular embodiment the polarizing beam splitter, sends one polarization direction to a first polarization-sensitive sensor 16 or a first focal plane array, and the beam splitter sends the second polarization direction towards a second polarization-sensitive sensor 16 or a second focal plane array. The first and second polarization-sensitive sensors 16, or first and second focal plane arrays, record the light that each is respectively viewing. The polarization-sensitive sensors 16 are set to record light for certain periods of time relative to when the laser pulse was generated.

Once the digital data associated with each one of the polarization-sensitive sensors 16, or FPAs, is obtained, the system 10 is able to use the same in order to characterize the depolarization rate of the water. This is accomplished by sending out multiple laser pulses from the beam transmitter of beam-projector assembly 14 and the polarization-sensitive sensors 16 capture at least one or multiple images for every laser pulse. The time of the gate limited polarization-sensitive sensors 16 are set to record for a certain period of time. For example, the polarization-sensitive sensor 16 is set to record when the laser pulse is above the surface of the water for an exemplary ten nanoseconds. Then, a picture is observed at each polarization-sensitive sensor 16. Subsequent to this, about ten nanoseconds later relative to the laser pulse, another picture is taken with each polarization-sensitive sensor 16 and recorded. Then, the range gates continue to be stepped down in a similar manner as the light moves through the water column towards the bottom. The information is recorded as the light goes deeper and deeper through the water. At each time, a pair of polarization images is captured and recorded. Notably, the time is quoted as relative to the sea surface. In one particular embodiment, there may be a pair of images at ten nanoseconds before the sea surface, at the sea surface, ten nanoseconds after the sea surface, 20 nanoseconds after the sea surface, 30 nanoseconds after the sea surface, 40 nanoseconds after the sea surface, and 50 nanoseconds after the sea surface, and so on until the system 10 desires to go as far below the sea surface as required.

The two sets of data obtained by the polarization-sensitive sensors 16, which are images of the ocean versus time (which is the same as depth in the water), and average intensity of the images may be computed. The average intensity of the co-polarization (CoPol) channel decreases over time. Typically, the intensity of the co-polarization (CoPol) channel decreases exponentially until it hits the bottom of the ocean or contacts an object 22. The cross-polarization (XrPol) channel increases over time (i.e., depth) because some of the cross-polarization (XrPol) light is being converted to co-polarization (CoPol) light through scattering. At a certain point, enough light will convert from cross-polarization (XrPol) to co-polarization (CoPol) as the light is attenuated by the water and starts to overcome the rate at which co-polarization (CoPol) is converted to cross-polarization (XrPol). At that point the cross-polarization (CoPol) channel begins to attenuate as well. At that location, both the co-polarization (CoPol) channel and the cross-polarization (XrPol) channel appear to attenuate exponentially after a certain depth generally equal to about 7.5 scattering lengths. When the beam contacts the bottom of the ocean, the beam is immediately depolarized. The co-polarization (CoPol) channel and the cross-polarization (XrPol) channel intensities become equal or very nearly equal upon contact.

The system 10 of the present disclosure is further able to detect shadows near the ocean floor. For example, an opaque object 22 will cast a shadow onto the ocean floor. The system 10 detects the shadow in both channels of polarization. The co-polarization (CoPol) channel is typically more effective in detecting shadows because it has brighter light in the water than the cross-polarization (XrPol) channel.

In accordance with another aspect of the present disclosure, the system 10 may also account for the movement of the aircraft. By doing so, the system is able to exploit the different flashes between the cross-polarization (XrPol) channel and the co-polarization (CoPol) channel that appear between respective different channels. Thus, the system 10 optimizes the sensor since it understands and previously determined how the water operates and behaves allowing the system 10 to set parameters of the cross-polarization (XrPol) channel and the co-polarization (CoPol) channel to establish an object 22 of interest that exploits the polarization properties of the environment. For example, if the bottom is known to be 40 feet deep, the system 10 does not want the cross-polarization (XrPol) channel to sample that bottom and it would be more desirable to have the system 10 only view anything in the water column because objects 22 in the water column will have a much higher contrast if it is not polluted with depolarized light from the ocean floor. Notably, the bottom depth may be obtained by any known conventional means. The system 10 also accounts for the depolarization rate of the water in this scenario. For example, if the depolarization rate is at a point where it is known that the light will never contact the bottom or as observed by the sensor, then it must know where that depth is so as to program the system accordingly. Thus, the system 10 could take advantage of the cross-polarization (XrPol) channel's higher contrast. For example, if the complete depolarization occurs at 100 meters, then the system 10 can be programmed to operate in shallower environments than 100 meters.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results.

More particularly, system 10 provides improvements to another technology or technical field. Namely, the present disclosure provides a LIDAR polarimetry system 10 that improves upon conventional LIDAR polarimetry systems. The at least one non-transitory computer readable storage medium that is in communication with laser beam-projector assembly 14 provides improvements to the function of the computer that executes, via one or more processors, the processes of determining precise distances from sensor to objects in a scattering medium through the use of imagery analysis. Particularly, the functioning of the computer may be made more efficient due to the manner in which the information and data is collected by the polarization-sensitive sensor 16. This allows the computer to process the return information and calculate the scatter or depolarization lengths or depolarization lights of the returning radiation in an improved and efficient way. Additionally, the polarization of the polarization-sensitive sensor relative to the beam 18 adds a specific, meaningful, and new teaching beyond what was previously well-understood, routine, or conventional in the field of oceanography. This feature of the polarization of the polarization-sensitive sensor 16 relative to the beam 18, in some instances, may be considered an unconventional step or arrangement that identifies this LIDAR polarimetry system 10 to a particular use. System 10, and the method thereof, further combine certain visual elements detected by the polarization-sensitive sensor 16 with instructions stored on the non-transitory computer readable storage medium, which may or may not be provided by a third party, to solve problems particular to object ranging. In one non-limiting example, the instructions encoded on the at least one non-transitory computer readable storage medium may include a self-referential table in order to improve the operation of the computer upon which the instructions are executed. In accordance with another exemplary aspect of the present disclosure, system 10 may be incorporated with various inertial tracking systems into beam-projector assembly 14 or of the platform 12. It is possible for the inertial tracking aspect of beam-projector assembly 14 or platform 12 to track the motion of both the platform 12 as well as the platform 12 relative to the object 22 submerged in the fluid. This may allow portions of the beam-projector assembly 14 to track motion of either the platform 12 or the object 22 relative to a reference frame (i.e., the other of the platform or the object) that can be accomplished via various algorithms and instructions or processes executed by the computer which is in communication with the beam-projector assembly 14. Furthermore, the at least one non-transitory computer readable storage medium of system 10 may include various memory systems for different types of computers that may be adapted for use with different types of processors without sacrificing efficiency, thus improving computer memory function.

The indefinite articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the disclosure are an example and the disclosure is not limited to the exact details shown or described.

The invention claimed is:

1. A method for determining a range to an object in a fluid, comprising:
generating polarized light via a polarized light source;
polarizing an imager relative to the polarized light;
transmitting the polarized light from the polarized light source into the fluid;
receiving reflected light from the object;
characterizing a depolarization rate of the fluid, based, at least in part, on the reflected light;
determining the range to the object, based, at least in part, on the depolarization rate of the fluid;
utilizing at least two polarization-sensitive sensors of the imager to receive the reflected polarized light from the object;
elliptically co-polarizing one of the at least two polarization-sensitive sensors relative to the polarized light; and
elliptically cross-polarizing one of the at least two polarization-sensitive sensors relative to the polarized light.

2. The method of claim 1, wherein the generated polarized light is one of linearly polarized, circularly polarized, or elliptically polarized.

3. The method of claim 1, further comprising:
utilizing a single image plane of the imager to receive the reflected polarized light from the object; wherein the single image plane includes an array of polarization-selective pixels.

4. The method of claim 1, further comprising:
linearly co-polarizing one of the at least two polarization-sensitive sensors relative to the polarized light; and
linearly cross-polarizing one of the at least two polarization-sensitive sensors relative to the polarized light.

5. The method of claim 1, further comprising:
circularly co-polarizing one of the at least two polarization-sensitive sensors relative to the polarized light; and
circularly cross-polarizing one of the at least two polarization-sensitive sensors relative to the polarized light.

6. The method of claim 1, further comprising:
transmitting the polarized light from the polarized light source into the fluid over successive time delays;
collecting at least one set of polarized images from a plurality of the successive time delays; and
computing a polarization intensity versus range, based, at least in part, on the at least one set of polarized images.

7. The method of claim 6, further comprising:
computing an overall attenuation rate of the transmitted polarized light in the fluid based, at least in part, on the polarization intensity versus range.

8. The method of claim 6, further comprising:
computing a scattering rate of the fluid based, at least in part, on the polarization intensity versus range.

9. The method of claim 6, further comprising:
computing, if present, depolarization properties of a bottom underlying the fluid based, at least in part, on the polarization intensity versus range.

10. The method of claim 1, further comprising:
generating a lookup table containing values of range versus degree of polarization (DOP).

11. The method of claim 1, further comprising:
gating the at least two polarization-sensitive sensors.

12. A system for determining a range to an object in a fluid, comprising:
a polarized light source directed to the object in the fluid;
a first imaging sensor receiving a reflected light from the fluid, wherein the first imaging sensor is cross-polarized with the polarized light source;

a second imaging sensor receiving the reflected light from the fluid, wherein the second imaging sensor is co-polarized with the polarized light source;

at least one processor for characterizing a depolarization rate of the fluid, based, at least in part, on the reflected light and determining the range to the object, based, at least in part, on the depolarization rate of the fluid;

the at least one processor further configured to elliptically cross-polarize the reflected light received at the at least one of the first imaging sensor or the second imaging sensor.

13. The system according to claim 12, further comprising an additional polarized light source.

14. The system according to claim 12, wherein the polarized light source is one of linearly polarized, circularly polarized, or elliptically polarized.

15. The system according to claim 12, further comprising:
a degree of polarization (DOP) measurement determined by the at least one processor; wherein the range to the object is based, at least in part, on the DOP measurement.

16. The system according to claim 15, wherein the range determination is bounded by a starting range and an ending range.

17. The system according to claim 12, further comprising:
at least one set of polarized images collected over a plurality of successive time delays; and a polarization intensity versus range measurement determined by the at least one processor; wherein the polarization intensity versus range measurement is, based, at least in part, on the at least one set of polarized images.

18. The system according to claim 12, further comprising:
a platform carrying polarized light source, the first imaging sensor, and the second imaging sensor.

* * * * *